(12) United States Patent
Donazar Moriones et al.

(10) Patent No.: US 10,041,472 B2
(45) Date of Patent: Aug. 7, 2018

(54) BLADE FOR A WIND TURBINE AND WIND TURBINE COMPRISING SAID BLADE

(71) Applicant: Acciona Windpower, S.A., Navarra (ES)

(72) Inventors: Carlos Donazar Moriones, Navarra (ES); Alvaro Gorostidi Martinez De Lecea, Navarra (ES); Sung Kyu Ha, Gyeonggi-do (KR); Teresa Arlaban Gabeiras, Navarra (ES); Jose Miguel Garcia Sayes, Navarra (ES); Miguel Nunez Polo, Navarra (ES)

(73) Assignee: Acciona Windpower, S.A., Navarra (ES)

( * ) Notice: Subject to any disclaimer, the term of this patent is extended or adjusted under 35 U.S.C. 154(b) by 306 days.

(21) Appl. No.: 14/962,482

(22) Filed: Dec. 8, 2015

(65) Prior Publication Data

US 2016/0177920 A1 Jun. 23, 2016

(30) Foreign Application Priority Data

Dec. 19, 2014 (EP) .................................. 14382546

(51) Int. Cl.
*F03D 1/06* (2006.01)
*F03D 3/06* (2006.01)
*F03D 3/00* (2006.01)

(52) U.S. Cl.
CPC ........... *F03D 1/0675* (2013.01); *F03D 3/062* (2013.01); *F03D 3/002* (2013.01); *F05B 2280/6013* (2013.01); *Y02E 10/721* (2013.01)

(58) Field of Classification Search
CPC ........ F03D 1/0675; F03D 3/002; F03D 3/062; F05B 2280/6013; Y02E 10/721
See application file for complete search history.

(56) References Cited

U.S. PATENT DOCUMENTS

| | | | | |
|---|---|---|---|---|
| 7,427,189 B2* | 9/2008 | Eyb | ........................ | F03D 1/065 416/226 |
| 8,075,278 B2* | 12/2011 | Zuteck | .................. | F03D 1/0675 416/146 R |
| 8,079,819 B2* | 12/2011 | Zuteck | .................. | F03D 1/0675 416/226 |
| 9,739,259 B2* | 8/2017 | Roth-Johnson | ....... | F03D 1/0633 |
| 2011/0052407 A1* | 3/2011 | Zuteck | .................... | B29C 70/22 416/241 R |
| 2011/0052408 A1 | 3/2011 | Zuteck | | |
| 2013/0101430 A1 | 4/2013 | Waas et al. | | |
| 2014/0193269 A1 | 7/2014 | Wetzel | | |
| 2014/0241895 A1* | 8/2014 | Yerramalli | ............ | F03D 1/0675 416/226 |

FOREIGN PATENT DOCUMENTS

DE 202013007886 U1 12/2014

* cited by examiner

*Primary Examiner* — Igor Kershteyn
(74) *Attorney, Agent, or Firm* — Hayes Soloway PC

(57) ABSTRACT

The present invention relates to a blade for a wind turbine comprising at least a longitudinal component comprising at least two longitudinal stretches with fibers at different orientations depending on the location of these stretches along the blade, where the orientation of the fibers in the stretches of the blade is adapted to the prevailing load states in each of the stretches.

22 Claims, 2 Drawing Sheets

BLADE FOR A WIND TURBINE AND WIND TURBINE COMPRISING SAID BLADE

OBJECT OF THE INVENTION

The present invention relates to a blade for a wind turbine comprising at least a longitudinal component comprising at least two longitudinal stretches with fibers at different orientations depending on the location of these stretches along the blade.

The object of the invention is a blade for a wind turbine where the orientation of the fibers in the stretches of the blade is adapted to the prevailing load states in each of the stretches.

BACKGROUND OF THE INVENTION

The current trend in the design of wind turbines is to increase the length of the blades in order to boost the annual energy production, trying to achieve a compromise between lightness and stiffness.

For this purpose, in the blade design stage the most adequate characteristics for each longitudinal component forming the blade are determined. Those longitudinal components are:

- an outer shell which provides the aerodynamic geometry of the blade, generally formed by two valves bonded together,
- beams adhered to the shells (or partially embedded in them) which provide the required structural stiffness.
- shearwebs which connect the beams to each other and transfer the shear loads.

In order to achieve light and enough stiff blades, polymeric materials are used in the design including fiber glass and/or fiber carbon fabrics embedded in a polymeric matrix, including in some locations wooden or plastic foam cores.

Generally, the manufacturing process of a longitudinal component of a wind turbine blade consists on arranging a number of layers of polymer fiber fabrics on a mould, stacked one above the other, following a stacking sequence previously established. The stacking sequence determines the number of layers of polymer fiber fabrics and the orientation of the fibers in each layer with respect to a reference direction which is usually the longitudinal direction of the blade. To increase the stiffness and/or enhance the buckling behavior of the longitudinal component, lightweight cores typically made of plastic foams or wood are arranged in certain parts between the layers of fabric. To guarantee the bonding of the different layers of fiber fabric among them and with the cores, a polymeric material, called matrix, is used.

The application of this matrix is performed by any of the usual procedures employed in the manufacturing of composite materials (resin infusion, RTM in its different variants, pultrusion, etc.) which in turn involve the use of different auxiliary elements to make the manufacturing process easier. In other cases, the fiber is presented as fabrics total or partially impregnated of said matrix (pre-pregs).

Usually the fiber orientations of the fabrics are selected depending on the longitudinal component of the blade and the type of stresses that it is subjected to. The most common orientations are 0°, ±45° and 90° with re spect to the longitudinal direction of the blade. Furthermore, the thickness of the composites (i.e. the number of layers of the composite formed by resin and fabric) used in each zone of the longitudinal components of the blade is selected depending on the magnitude of said predominant stresses.

Fabrics are formed using the most appropriate fiber orientation (or the most appropriate fiber orientations) for each longitudinal component. The fabrics may comprise fibers with different orientations with respect to a reference direction. Generally the fabrics comprise fibers with 1, 2 or 3 with the following standard combinations:
- uniaxial at 0°
- biaxial at +/−45°
- triaxial at 0° and +/−45°

These fabrics are subsequently placed in the mould for manufacturing the blade, extending all along each longitudinal component.

Thus, depending on the type of stresses that each longitudinal component withstands, one or another type of fabric, or even combinations of several layers of different types of fabrics are used. Furthermore, depending on the magnitude of stresses, the number of layers for each zone of the longitudinal component are selected.

In state of the art configurations, uniaxial fibers at 0° on beams and biaxial fibers at +/−45° or triaxial 0° and +/−45° on shearwebs and the outer shell are normally used.

The applicant knows the existence of precedents which describe the use of biaxial or triaxial fabrics with angles different from 45°. Among them, the article "Innovative design procedures for large-scale wind turbine blades (JEC Composites Magazine. N° 70 January-February 2012)" is known, where it is proposed to use fabrics with fiber orientations different from 45° in certain components of the blade according to the relationship between normal and shear stresses in each of these components, wherein more specifically it is stated that the shell of the blade is completely manufactured from triaxial fiber fabrics with orientations 0°, +/−25°.

However, in the previous precedent a single fiber orientation in uniaxial fabrics or a single combination of fiber orientations in biaxial or triaxial fabrics is used for the entire longitudinal component of the blade, so that the same fiber orientation (or the same fiber orientations) is used within the entire longitudinal component.

DESCRIPTION OF THE INVENTION

The present invention relates to a blade for a wind turbine comprising at least a longitudinal component which comprises at least two longitudinal stretches:
- a first longitudinal stretch comprising a first plurality of fibers, wherein the first plurality of fibers is arranged at a first angle with respect to a reference direction, and
- a second longitudinal stretch closer to a tip of the blade than the first longitudinal stretch which comprises at least a second plurality of fibers, wherein the second plurality of fibers is arranged at a second angle with respect to the reference direction.

The first angle with respect to the reference direction of the first plurality of fibers of the first longitudinal stretch is greater than the second angle with respect to the reference direction of the second plurality of fibers of the second longitudinal stretch.

The longitudinal direction of the blade is used as a reference direction although other reference directions can be used, such as the longitudinal direction of the longitudinal component. The longitudinal direction of the longitudinal component can either be parallel to the longitudinal direction of the blade or not.

The at least one longitudinal component of the wind turbine blade is selected from the following:

an outer shell which provides the aerodynamic geometry of the blade, generally formed by two valves bonded together, at least one of the valves cited above, at least a beam adhered to the shells (or partially embedded in them) which provide the required structural stiffness, at least a shearweb which connect the beams to each other and transfer the shear loads.

This arrangement of fibers is especially advantageous because the longitudinal component of the wind turbine blade comprises:

a first zone where the shear stresses prevail over the normal and longitudinal stresses, and, a second zone closer to the tip of the blade than the first zone, wherein longitudinal stresses prevail over shear and normal stresses.

In an embodiment, the first zone of the longitudinal component extends from the root of the blade to approximately a region where a chord of the blade is maximum.

Optionally, the first longitudinal stretch is comprised within the first zone of the longitudinal component of the blade on which the shear stresses prevail over the normal and longitudinal stresses and the second longitudinal stretch is comprised within the second zone of the longitudinal component of the blade on which the longitudinal stresses prevail over the normal and shear stresses.

Thus, the first longitudinal stretch is configured to withstand stress states wherein the shear stresses prevail over normal and longitudinal stresses, and the second longitudinal stretch is configured to withstand stress states wherein the longitudinal stresses prevail over shear and normal stresses, thereby adapting the orientation of the first and second plurality of fibers of each longitudinal stretch, to the predominant stresses in the zones where they are comprised within.

In an also optional way, the first and second longitudinal stretches are adjacent.

Optionally, the first angle with respect to the reference direction of the first plurality of fibers of the first longitudinal stretch is within the range [30°, 60°] or within its conjugate [−30°, −60°].

Optionally, the second angle with respect to the reference direction of the second plurality of fibers of the second longitudinal stretch is within the range [10°, 30°] or within its conjugate [−10°, −30°].

Optionally, the at least one longitudinal component of the wind turbine blade further comprises a third longitudinal stretch disposed between the first longitudinal stretch and the second longitudinal stretch, comprising at least a part of the first plurality of fibers of the first longitudinal stretch overlapped with at least a part of the second plurality of fibers of the second longitudinal stretch. Said third stretch may further comprise a third plurality of fibers with an angle different from the first and the second angles with respect to the reference direction.

Optionally, the at least one longitudinal component of the blade further comprises a fourth longitudinal stretch, closer to the root of the blade than the first longitudinal stretch, which comprises, at least a fourth plurality of fibers disposed at a fourth angle with respect to the reference direction which is lower than the first angle with respect to the reference direction of the first plurality of fibers of the first longitudinal stretch. In an embodiment, the fourth longitudinal stretch comprises at least part of the root of the blade, being the longitudinal component preferably at least one of the valves.

The at least one longitudinal component may comprise, between two adjacent longitudinal stretches as previously described, a transition stretch which comprises at least a fifth plurality of fibers, disposed at a fifth angle with respect to the reference direction whose value is comprised within the angles of the plurality of fibers of adjacent longitudinal stretches.

Thus configured, the blade allows to reduce the number of layers of fabric arranged in each longitudinal stretch with regard to the blades of the state of the art, due to the fact that the used orientations of the fibers are defined according to the prevailing type of stresses in each of the longitudinal stretches of the associated longitudinal component and thus the load which can be withstood by each layer in each stretch is maximized while maintaining the weight and cost of the blade as low as possible.

The invention also refers to a wind turbine which comprises at least one blade with the features previously described.

PREFERRED EMBODIMENT OF THE INVENTION

Figure 1:
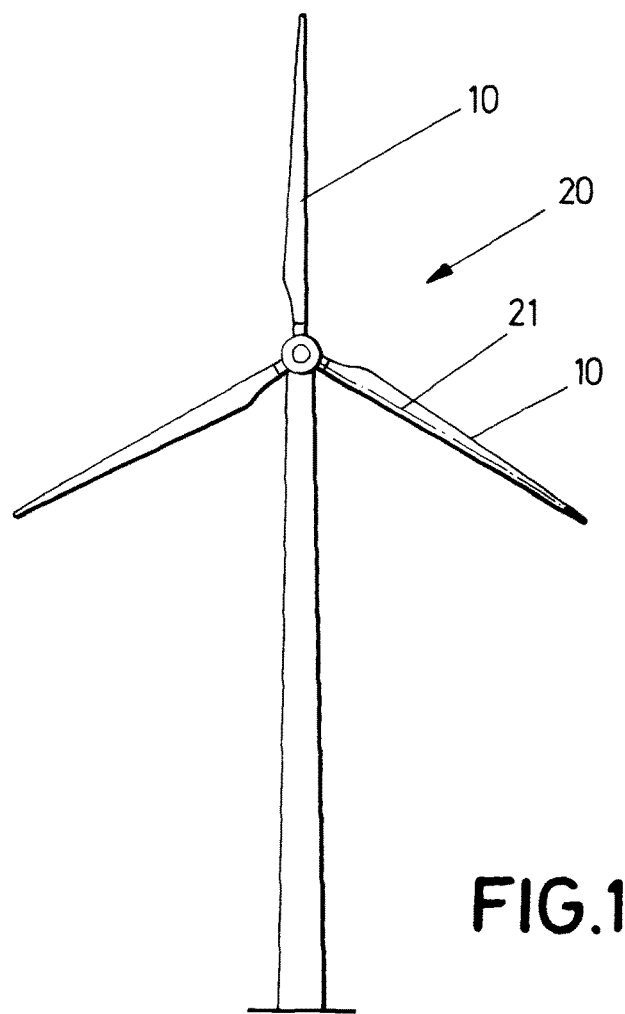
FIG. 1 shows an elevation view of a wind turbine comprising three blades as those of the present invention.
Figure 2:
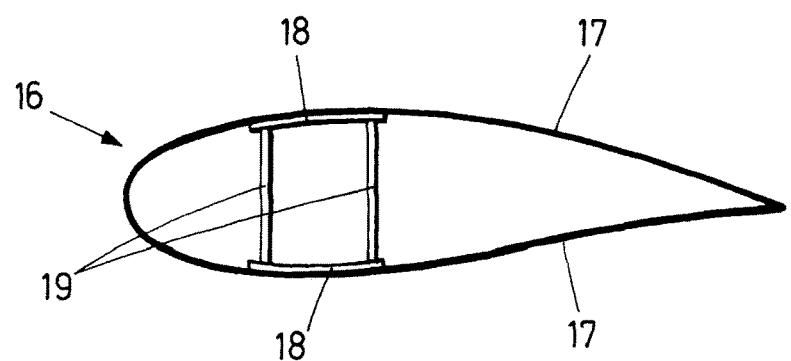
FIG. 2 shows a cross section of one of the blades shown in FIG. 1.
Figure 3:
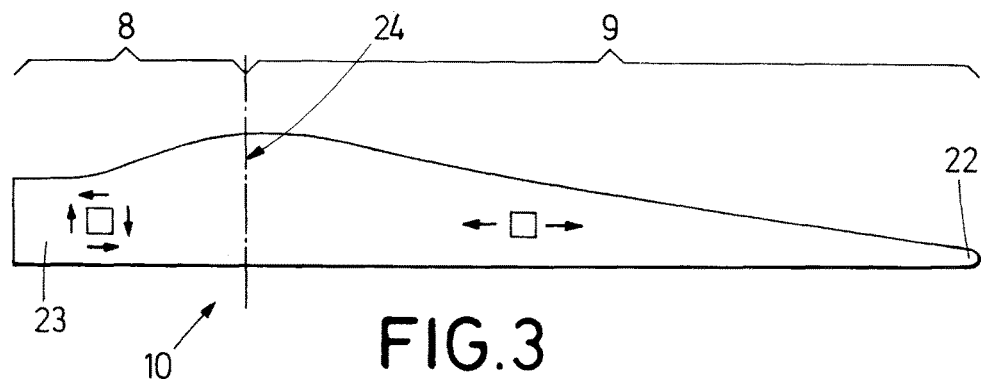
FIG. 3 shows a schematic view of the prevailing stresses in each area of the blade.
Figure 4:
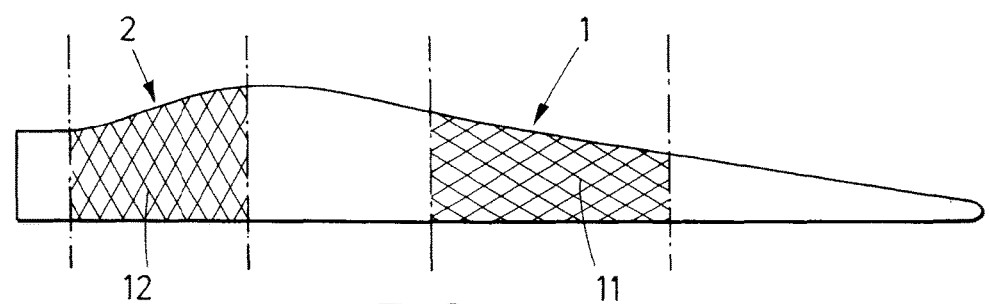
FIG. 4 shows a schematic view of the first plurality of fibers and the second plurality of fibers of the first and second stretches respectively, of at least a longitudinal component of the blade of the present invention.
Figure 5:
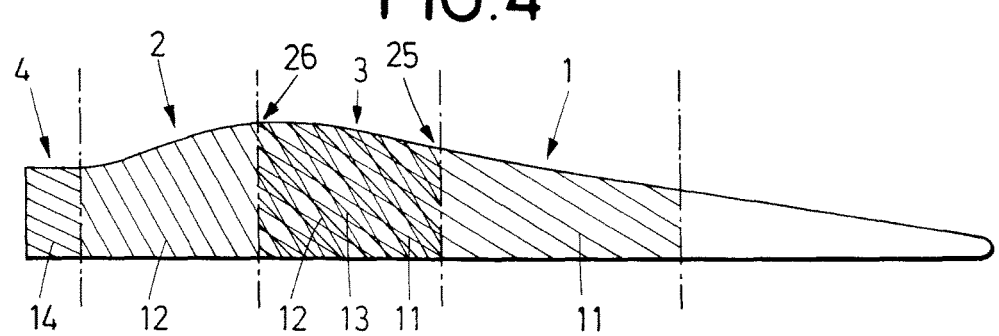
FIG. 5 shows a schematic view of the first plurality of fibers, the second plurality of fibers, the third plurality of fibers and the fourth plurality of fibers of the first, second, third and fourth longitudinal stretch respectively of at least a longitudinal component of the blade of the present invention.
Figure 6:
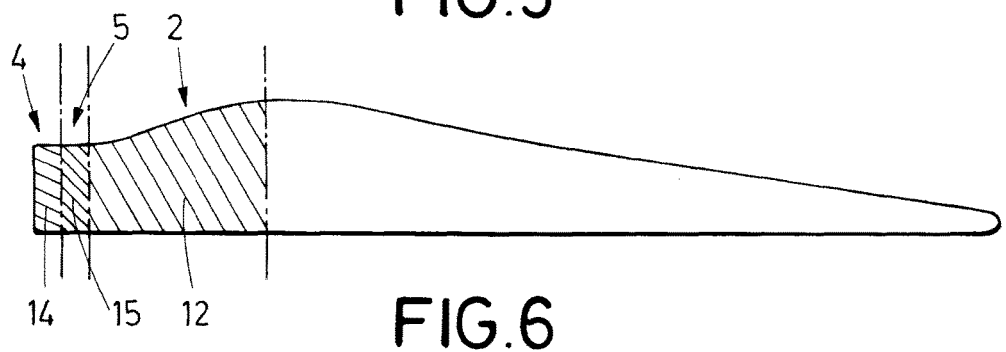
FIG. 6 shows a schematic view of the first plurality of fibers, the fourth plurality of fibers and the fifth plurality of fibers of the first, fourth and fifth longitudinal stretch respectively of at least a longitudinal component of the blade of the present invention.

Below, a detailed description of the blade (10) for a wind turbine (20) is performed.

The blade (10) comprises a root (23), a tip (22), a chord of a section for each section of a plurality of sections of the blade (10) and at least a longitudinal component (16, 17, 18, 19) which comprises at least two longitudinal stretches (1, 2, 3, 4, 5):

a first longitudinal stretch (1) comprising a first plurality of fibers (11), wherein the first plurality of fibers (11) is disposed at a first angle with respect to a reference direction, the reference direction being preferably the longitudinal direction (21) of the blade (10), and a second longitudinal stretch (2) closer to the tip (22) of the blade (10) than the first longitudinal stretch (1) which comprises at least a second plurality of fibers (12), wherein the second plurality of fibers (12) is disposed at a second angle with respect to the reference direction, wherein the first angle with respect to the reference direction of the first plurality of fibers (11) of the first longitudinal stretch (1) is greater than the second angle with respect to the reference direction of the second plurality of fibers (12) of the second longitudinal stretch (2).

The at least one longitudinal component (16, 17, 18, 19) of the wind turbine (20) blade (10) of the is selected from the following:
- an outer shell (16) generally composed by two valves (17) joined together in an area of a leading edge and an area of a trailing edge of the blade,
- at least one of the valves (17) cited above,
- at least a beam (18) adhered to the outer shells (16) or partially embedded in them (16),
- at least a shearweb (19) which connect the beams (18) to each other (19), being preferably a valve (17), or a beam (18).

The at least one longitudinal component (16, 17, 18, 19) of the wind turbine (20) blade (10) additionally comprises:
- a first zone (8) from the root (23) of the blade (10) to approximately a zone wherein the chord of the blade is maximum (24) wherein the shear stresses prevail over the normal and longitudinal stresses, wherein the first longitudinal stretch (1) is comprised within this first zone (8), and,
- a second zone (9) from the end of the first zone (8) to the tip (22) of the blade (10) wherein the longitudinal stresses prevail over shear and normal stresses, the second longitudinal stretch (2) is comprised within this second zone (9).

The first angle with respect to the reference direction of the first plurality of fibers (11) of the first longitudinal stretch (1) is within the range [30°, 60°], being preferably 45°, or within its conjugate [−30°, −60°], being preferably −45°.

Optionally, the second angle with respect to the reference direction of the second plurality of fibers (12) of the second longitudinal stretch (2) is within the range [10°, 30°], being preferably 25°, o within its conjugate [−10°, −30°], being preferably −25°.

The first (11) and second (12) plurality of fibers are usually constituted by prefabricated fabrics with woven fibers according to the specified angles which are arranged in successive stacked layers. The number of layers of fabric depends on the magnitude and the load states in each zone (8, 9) of the blade. Using a first (11) and a second (12) plurality of fibers with angles as described, the number of layers in each zone (8, 9) can be reduced regarding the blades of the prior state of the art.

In a first embodiment the firs longitudinal stretch (1) and the second longitudinal stretch (2) are adjacent.

In other embodiments, the at least one longitudinal component (16, 17, 18, 19) of the blade (10) of the wind turbine (20) additionally comprises a third longitudinal stretch (3) arranged between the first longitudinal stretch (1) and the second longitudinal stretch (2), which comprises at least a part of the first plurality of fibers (11) of the first longitudinal stretch (1) overlapped with at least a part of the second plurality of fibers (12) of the second longitudinal stretch (2). According to these embodiments, a part of the first (11) and second (12) plurality of fibers extend beyond the first (1) and second (2) longitudinal stretch and they are overlapped to achieve a suitable transition.

Said superposition can be achieved in two different ways:
In a second embodiment, the superposition of the fibers of the third longitudinal stretch (3) is performed so that all the first plurality of fibers (11) of the first longitudinal stretch (1) is overlapped with all of the second plurality of fibers (12) of the second longitudinal stretch (2).

In a third embodiment, the superposition of the fibers of the third longitudinal stretch (3) is performed so that each of the fibers of the first plurality of fibers (11) of the first longitudinal stretch (1) is overlapped with one of the fibers of the second plurality of fibers (12) of the second longitudinal stretch (2) .

Moreover, the third longitudinal stretch (3) may comprise a third plurality of fibers (13) with an angle different from the first and second angle with respect to the reference direction, overlapping by any of the ways specified in the state of the art, in a first end (25) of the third longitudinal stretch (3) adjacent to the first longitudinal stretch (1), at least a part of the third plurality of fibers (13) with at least a part of the first plurality of fibers (11) and in a second end (26) of the third longitudinal stretch (3) adjacent to the second longitudinal stretch (2), at least a part of the third plurality of fibers (13) with at least a part of the second plurality of fibers (12).

According to any of previous embodiments, the third longitudinal stretch (3) forms a transition zone between the first (1) and the second longitudinal stretch (2) wherein appropriate properties related to the change of the type of predominant stresses are achieved.

The at least one longitudinal component (16, 17, 18, 19) of the blade (10) of the wind turbine (20) additionally comprises a fourth longitudinal stretch (4) closer to the root (23) of the blade (20) than the first longitudinal stretch (1), which comprises at least a fourth plurality of fibers (14), wherein the fourth plurality of fibers (14) is disposed at a fourth angle with respect to the reference direction which is smaller than the first angle with respect to the reference direction of the first plurality of fibers (11) of the first longitudinal stretch (1).

In other embodiments, the at least one longitudinal component (16, 17, 18, 19) comprises, between two adjacent longitudinal stretches as previously described, a transition stretch which comprises at least a fifth plurality of fibers (15), wherein the fifth plurality of fibers (15) is disposed at a fifth angle with respect to the reference direction and whose value is comprised between the angles of the plurality of fibers of adjacent longitudinal stretches.

The invention also relates to a wind turbine (20) which comprises at least a blade (10) with the features previously described.

The invention claimed is:
1. Blade for a wind turbine comprising at least a longitudinal component which comprises at least two longitudinal stretches:
- a first longitudinal stretch comprising a first plurality of fibers, wherein the first plurality of fibers is arranged at a first angle with respect to a reference direction, and
- a second longitudinal stretch closer to a tip of the blade than the first longitudinal stretch, the second longitudinal stretch comprising at least a second plurality of fibers, wherein the second plurality of fibers is arranged at a second angle with respect to the reference direction, wherein the first angle with respect to the reference direction of the first plurality of fibers of the first longitudinal stretch is greater than the second angle with respect to the reference direction of the second plurality of fibers of the second longitudinal stretch.

2. The blade of claim 1, wherein the at least one longitudinal component additionally comprises:
- a first zone where shear stresses prevail over normal and longitudinal stresses, and a second zone closer to the tip of the blade than the first zone, wherein the longitudinal stresses prevail over the shear and normal stresses.

3. The blade of claim 2, further comprising a root and wherein the first zone of the longitudinal component extends from the root of the blade to a region where a chord of the blade is maximum.

4. The blade of claim 3, further comprising a tip, wherein the first longitudinal stretch is comprised within the first zone, the second zone extends from an end of the first zone to the tip of the blade, and the second longitudinal stretch is comprised within the second zone.

5. The blade of claim 1, wherein the first angle with respect to the reference direction of the first plurality of fibers of the first longitudinal stretch is in a range between 30° and 60°, or in a range between −30° and −60°.

6. The blade of claim 1, wherein the second angle with respect to the reference direction of the second plurality of fibers of the second longitudinal stretch is in a range between 10° and 30°, or in a range between −10° and −30°.

7. The blade of claim 1, wherein the first longitudinal stretch and the second longitudinal stretch are adjacent.

8. The blade of claim 1, wherein the at least one longitudinal component of the blade of the wind turbine comprises at least a third longitudinal stretch disposed between the first longitudinal stretch and the second longitudinal stretch, which comprises at least a part of the first plurality of fibers of the first longitudinal stretch overlapped with at least a part of the second plurality of fibers of the second longitudinal stretch in such a manner that a superposition of fibers of the third longitudinal stretch is performed.

9. The blade of claim 8, wherein the superposition of the fibers of the third longitudinal stretch is performed so that all the first plurality of fibers of the first longitudinal stretch is overlapped with all of the second plurality of fibers of the second longitudinal stretch.

10. The blade of claim 8, wherein the superposition of the fibers of the third longitudinal stretch is performed so that each of the fibers of the first plurality of fibers of the first longitudinal stretch is overlapped with one of the fibers of the second plurality of fibers of the second longitudinal stretch.

11. The blade of claim 8, wherein the third longitudinal stretch additionally comprises a third plurality of fibers with a third angle different from the first and the second angles with respect to the reference direction.

12. The blade of claim 11, further comprising a first end of the third longitudinal stretch adjacent to the first longitudinal stretch, wherein at least a part of the third plurality of fibers are overlapped with at least a part of the first plurality of fibers, and a second end of the third longitudinal stretch adjacent to the second longitudinal stretch wherein at least a part of the third plurality of fibers are overlapped with at least a part of the second plurality of fibers.

13. The blade of claim 1, wherein the at least one longitudinal component of the blade of the wind turbine additionally comprises a fourth longitudinal stretch closer to the root of the blade than the first longitudinal stretch, which comprises, at least a fourth plurality of fibers, wherein the fourth plurality of fibers is disposed at a fourth angle with respect to the reference direction which is lower than the first angle with respect to the reference direction of the first plurality of the fibers of the first longitudinal stretch.

14. The blade of claim 13, wherein the fourth longitudinal stretch comprises at least part of the root of the blade.

15. The blade of claim 1, wherein the at least one longitudinal component of the blade comprises, between two adjacent longitudinal stretches, a transition stretch which comprises at least a fifth plurality of fibers, wherein the fifth plurality of fibers is disposed at a fifth angle with respect to the reference direction whose value is comprised between the angles of the plurality of fibers of adjacent longitudinal stretches.

16. The blade of claim 1, wherein the at least one longitudinal component of the blade of the wind turbine is selected from the following:
   an outer shell generally composed by two valves joined together in an area of a leading edge and an area of a trailing edge of the blade,
   at least one of the valves cited above,
   at least a beam adhered to the outer shells or partially embedded in them,
   at least a shearweb which connect the beams to each other.

17. The blade of claim 1, wherein the reference direction is the longitudinal direction of the blade or the longitudinal direction of the longitudinal component.

18. The blade of claim 2, wherein the at least one longitudinal component of the blade of the wind turbine comprises at least a third longitudinal stretch disposed between the first longitudinal stretch and the second longitudinal stretch, which comprises at least a part of the first plurality of fibers of the first longitudinal stretch overlapped with at least a part of the second plurality of fibers of the second longitudinal stretch in such a manner that a superposition of fibers of the third longitudinal stretch is performed.

19. The blade of claim 3, wherein the at least one longitudinal component of the blade of the wind turbine comprises at least a third longitudinal stretch disposed between the first longitudinal stretch and the second longitudinal stretch, which comprises at least a part of the first plurality of fibers of the first longitudinal stretch overlapped with at least a part of the second plurality of fibers of the second longitudinal stretch in such a manner that a superposition of fibers of the third longitudinal stretch is performed.

20. The blade of claim 5, wherein the first angle with respect to the reference direction of the first plurality of fibers of the first longitudinal stretch is 45° or −45°.

21. The blade of claim 6, wherein the second angle with respect to the reference direction of the second plurality of fibers of the second longitudinal stretch is 25° or −25°.

22. Wind turbine which comprises at least a blade which in turn comprises at least a longitudinal component which comprises at least two longitudinal stretches:
   a first longitudinal stretch comprising a first plurality of fibers, wherein the first plurality of fibers is arranged at a first angle with respect to a reference direction, and
   a second longitudinal stretch closer to a tip of the blade than the first longitudinal stretch, the second longitudinal stretch comprising at least a second plurality of fibers, wherein the second plurality of fibers is arranged at a second angle with respect to the reference direction,
wherein the first angle with respect to the reference direction of the first plurality of fibers of the first longitudinal stretch is greater than the second angle with respect to the reference direction of the second plurality of fibers of the second longitudinal stretch.

* * * * *